(12) United States Patent
Chang et al.

(10) Patent No.: US 8,968,933 B2
(45) Date of Patent: *Mar. 3, 2015

(54) PROCESS FOR PREPARATION OF ANODE ACTIVE MATERIAL

(71) Applicant: LG Chem, Ltd., Seoul (KR)

(72) Inventors: Sung-Kyun Chang, Daejeon (KR); WonSeok Chang, Daejeon (KR); JungMin Han, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,447

(22) Filed: Apr. 2, 2013

(65) Prior Publication Data

US 2013/0244106 A1    Sep. 19, 2013

Related U.S. Application Data

(63) Continuation of application No. PCT/KR2012/000405, filed on Jan. 18, 2012.

(30) Foreign Application Priority Data

Feb. 15, 2011 (KR) .......................... 10-2011-0013068

(51) Int. Cl.
| | | |
|---|---|---|
| *H01M 4/133* | (2010.01) | |
| *H01M 4/587* | (2010.01) | |
| *H01M 4/36* | (2006.01) | |
| *H01M 10/052* | (2010.01) | |
| *H01M 4/48* | (2010.01) | |

(52) U.S. Cl.
CPC .............. *H01M 4/133* (2013.01); *H01M 4/587* (2013.01); *H01M 4/366* (2013.01); *H01M 10/052* (2013.01); *H01M 4/483* (2013.01); *Y02E 60/122* (2013.01)
USPC .................................................... 429/231.4

(58) Field of Classification Search
USPC ........................................................ 429/211
See application file for complete search history.

(56) References Cited

U.S. PATENT DOCUMENTS

| | | | | |
|---|---|---|---|---|
| 2004/0115535 | A1* | 6/2004 | Morita et al. ............... | 429/231.8 |
| 2005/0136330 | A1* | 6/2005 | Mao et al. ................ | 429/231.95 |
| 2005/0287440 | A1 | 12/2005 | Chang et al. | |
| 2006/0134516 | A1* | 6/2006 | Im et al. ....... | 429/218.1 |
| 2009/0169994 | A1* | 7/2009 | Mah et al. ................. | 429/218.1 |
| 2010/0136432 | A1 | 6/2010 | Kim | |
| 2013/0288106 | A1* | 10/2013 | Chang et al. ................... | 429/156 |
| 2013/0288131 | A1* | 10/2013 | Chang et al. ............... | 429/231.8 |
| 2013/0295433 | A1* | 11/2013 | Chang et al. .................. | 429/156 |

FOREIGN PATENT DOCUMENTS

| | | | | |
|---|---|---|---|---|
| EP | 1575104 A1 * | 9/2005 | .............. | H01M 4/02 |
| JP | 2008-186732 A | 8/2008 | | |
| KR | 2001-0054903 A | 7/2001 | | |
| KR | 10-0315232 A | 11/2001 | | |
| KR | 10-2004-0082803 A | 9/2004 | | |
| KR | 10-2006-0047424 A | 5/2006 | | |
| KR | 10-2010-0062083 A | 6/2010 | | |

OTHER PUBLICATIONS

Uono et al. Journal of The Electrochemical Society, 153 (9) A1708-A1713 (2006).*
International Search Report issued in PCT/KR2012/000405, mailed on Sep. 28, 2012.

* cited by examiner

*Primary Examiner* — Mark F Huff
*Assistant Examiner* — Olatunji Godo
(74) *Attorney, Agent, or Firm* — Birch, Stewart, Kolasch & Birch, LLP

(57) ABSTRACT

Disclosed is a method for preparing an anode active material comprising a core composed of a crystalline carbon-based material, and a composite coating layer comprising (a) mixing a precursor for a raw material of one or more materials selected from the group consisting of low crystalline carbon and amorphous carbon with silicon oxide enabling intercalation and deintercalation of ions, followed by purification, to prepare a mixture for coating, (b) mixing the mixture for coating with a crystalline carbon-based material to prepare a core-shell precursor comprising the raw material mixture for coating applied to the core composed of the crystalline carbon-based material, and (c) baking the core-shell precursor to carbonize the raw material of the one or more materials selected from the group consisting of low crystalline carbon and amorphous carbon into the one or more materials selected from the group consisting of low crystalline carbon and amorphous carbon.

12 Claims, No Drawings

PROCESS FOR PREPARATION OF ANODE ACTIVE MATERIAL

This application is a Continuation of PCT International Application No. PCT/KR2012/000405 filed on Jan. 18, 2012, which claims priority under 35 U.S.C 119(a) to Application No. 10-2011-0013068 filed in Republic of Korea on Feb. 15, 2011, all of which are hereby expressly incorporated by reference into the present application.

TECHNICAL FIELD

The present invention relates to a method for preparing an anode active material. More specifically, the present invention relates to a method for preparing an anode active material comprising a core composed of a crystalline carbon-based material and a composite coating layer composed of one or more materials selected from the group consisting of low crystalline carbon and amorphous carbon, and silicon oxide enabling intercalation and deintercalation of ions, through a process including mixing a precursor for a raw material of the one or more materials selected from the group consisting of low crystalline carbon and amorphous carbon with silicon oxide enabling intercalation and deintercalation of ions, followed by purification, to prepare a mixture for coating, mixing the mixture for coating with a crystalline carbon-based material to prepare a core-shell precursor comprising the raw material mixture for coating applied to the core composed of the crystalline carbon-based material, and baking the core-shell precursor to carbonize the raw material of the one or more materials selected from the group consisting of low crystalline carbon and amorphous carbon into the one or more materials selected from the group consisting of low crystalline carbon and amorphous carbon.

BACKGROUND ART

Technological development and increased demand for mobile equipment have led to a sharp rise in the demand for secondary batteries as energy sources. Among these secondary batteries, lithium secondary batteries having high energy density and voltage, long cycle lifespan and low self-discharge are commercially available and widely used.

In addition, increased interest in environmental issues has brought about a great deal of research associated with electric vehicles (EVs), hybrid electric vehicles (HEVs) and plug-in hybrid electric vehicles as alternatives to vehicles using fossil fuels such as gasoline vehicles and diesel vehicles which are major causes of air pollution. Nickel-metal hydride (Ni-MH) secondary batteries are generally used as power sources of electric vehicles (EVs) and hybrid electric vehicles (HEVs). However, a great deal of study associated with use of lithium secondary batteries with high energy density, discharge voltage and power stability is currently underway and some are commercially available.

A lithium secondary battery has a structure in which a non-aqueous electrolyte comprising a lithium salt is impregnated into an electrode assembly comprising a cathode and an anode, each comprising an active material coated on a current collector, and a porous separator interposed therebetween.

Lithium cobalt oxide, lithium manganese oxide, lithium nickel oxide, lithium composite oxide and the like are generally used as cathode active materials of lithium secondary batteries and carbon-based materials are generally used as anode active materials thereof. Use of silicon compounds, sulfur compounds and the like has also been considered.

However, lithium secondary batteries have various problems, in particular, problems associated with fabrication and driving properties of an anode.

First, regarding fabrication of an anode, a carbon-based material generally used as an anode active material is highly hydrophobic and thus has problems of low miscibility with a hydrophilic solvent and low dispersion uniformity of solid components in the process of preparing a slurry for electrode fabrication. In addition, this hydrophobicity of the anode active material complicates impregnation of highly polar electrolytes in the battery fabrication process. The electrolyte impregnation process is a bottleneck in the battery fabrication process, thus greatly decreasing productivity.

In order to solve these problems, addition of a surfactant to an anode, an electrolyte or the like is suggested. However, disadvantageously, the surfactant may have side effects on driving properties of batteries.

Meanwhile, regarding driving properties of the anode, disadvantageously, the carbon-based anode active material induces initial irreversible reaction, since a solid electrolyte interface (SEI) layer is formed on the surface of the carbon-based anode active material during an initial charge/discharge process (activation process), and battery capacity is reduced due to exhaustion of the electrolyte caused by removal (breakage) and regeneration of the SEI layer during a continuous charge/discharge process.

In order to solve these problems, various methods such as formation of an SEI layer through stronger bond or formation of an oxide layer on the surface of the anode active material have been attempted. These methods have properties unsuitable for commercialization such as deterioration in electrical conductivity caused by the oxide layer and deterioration in productivity caused by additional processes.

Furthermore, it is not easy to form oxide layers having different physical properties on a non-polar anode active material and thus formation of a uniform oxide layer inevitably increases process cost.

Accordingly, there is an increasing need for methods capable of ultimately solving these problems.

DISCLOSURE

Technical Problem

Therefore, the present invention has been made to solve the above and other technical problems that have yet to be resolved.

As a result of a variety of extensive and intensive studies and experiments to solve the problems as described above, the present inventors developed an anode active material having a specific structure capable of solving both various problems associated with an anode production process and many problems associated with battery operation properties, i.e., an anode active material having a specific coating layer formed on a crystalline carbon-based core and newly developed a method for effectively producing an anode active material through a simple process. The present invention has been completed based on these developments.

Technical Solution

In accordance with one aspect of the present invention, provided is a method for preparing an anode active material comprising a core composed of a crystalline carbon-based material, and a composite coating layer composed of one or more materials selected from the group consisting of low crystalline carbon and amorphous carbon, and silicon oxide enabling intercalation and deintercalation of ions, the method comprising: (a) mixing a precursor for a raw material of the one or more materials selected from the group consisting of low crystalline carbon and amorphous carbon with silicon oxide enabling intercalation and deintercalation of ions, followed by purification, to prepare a mixture for coating; (b) mixing the mixture for coating with a crystalline carbon-based material to prepare a core-shell precursor comprising the raw material mixture for coating applied to the core composed of the crystalline carbon-based material; and (c) baking the core-shell precursor to carbonize the raw material of the one or more materials selected from the group consisting of low crystalline carbon and amorphous carbon into the one or more materials selected from the group consisting of low crystalline carbon and amorphous carbon.

The crystalline carbon-based material, which is the core component, and one or more materials selected from the group consisting of low crystalline carbon and amorphous carbon are highly hydrophobic. In addition, generally, the raw material (raw materials of one or more materials selected from the group consisting of low crystalline carbon and amorphous carbon) converted into one or more materials selected from the group consisting of low crystalline carbon and amorphous carbon by baking is also highly hydrophobic. Accordingly, when the raw material of one or more materials selected from the group consisting of low crystalline carbon and amorphous carbon and silicon oxide enabling intercalation and deintercalation of ions and having relatively high hydrophilicity are mixed with the crystalline carbon-based material, it is difficult to homogeneously mix the raw material of one or more materials selected from the group consisting of low crystalline carbon and amorphous carbon with the silicon oxide enabling intercalation and deintercalation of ions and it is thus difficult to prepare a desired core-shell precursor having a structure in which the homogeneous mixture is applied to a core comprising a crystalline carbon-based material. For this reason, a domain comprising the one or more materials selected from the group consisting of low crystalline carbon and amorphous carbon as a main component and a domain comprising silicon oxide enabling intercalation and deintercalation of ions as a main component are present in the composite coating layer composed of the anode active material obtained after baking and all the desired effects of the present invention are not exerted.

On the other hand, according to the present invention, first, the precursor for the raw material of one or more materials selected from the group consisting of low crystalline carbon and amorphous carbon is mixed with silicon oxide enabling intercalation and deintercalation of ions, followed by purification to prepare a mixture for coating, and the mixture is mixed with the crystalline carbon-based material. As a result, it is possible to obtain a core-shell precursor having a structure in which the homogeneous mixture for coating comprising the raw material of one or more materials selected from the group consisting of low crystalline carbon and amorphous carbon, and silicon oxide enabling intercalation and deintercalation of ions is applied to the core comprising the crystalline carbon-based material.

When the core-shell precursor thus obtained is baked, it is possible to obtain an anode active material having a structure in which the core comprising the crystalline carbon-based material is surrounded with the composite coating layer comprising a matrix composed of one component of one or more materials selected from the group consisting of low crystalline carbon and amorphous carbon and silicon oxide enabling intercalation and deintercalation of ions, and a filler composed of the other component.

In general, a carbon-based material is classified into graphite having a complete layered crystal structure such as natural graphite, soft carbon having a low-crystalline layered crystal structure (graphene structure in which hexagonal honeycomb shaped planes of carbon are arrayed in the form of a layer), and hard carbon having a structure in which the low-crystalline structures are mixed with non-crystalline parts.

In a preferred embodiment, the crystalline carbon-based material which is the core component of the present invention may be graphite, or a mixture of graphite and low crystalline carbon, and one of the composite coating layer components may be low-crystalline carbon, amorphous carbon or a mixture thereof.

A preferred example of the precursor for the raw material of one or more materials selected from the group consisting of low crystalline carbon and amorphous carbon is a pitch solution. In general, pitch is classified into petroleum-based pitch and coal-based pitch and the precursor is derived from a coal-based material, a petroleum-based material, or a petroleum/coal-based mixture. For example, since the petroleum-based pitch is obtained by refining a crude oil and purifying an impurity component from the remaining high-boiling point residue, a highly homogeneous mixture for coating can be prepared by mixing the pitch solution with silicon oxide enabling intercalation and deintercalation of ions, followed by purification.

Specifically, the purification of the pitch solution is carried out by adding a part of components and removing impurities such as hydrocarbons and sulfur having a relatively low boiling point by thermal treatment under an inert atmosphere at a temperature of 350° C. to 700° C., followed by cooling and grinding. Through this process, the mixture for coating can be obtained.

In particular, when the hydrophilic material comprising silicon oxide enabling intercalation and deintercalation of ions is added to the pitch solution, uniformity of dispersion of silicon oxide enabling intercalation and deintercalation of ions can be maximized, as compared to a case in which silicon oxide enabling intercalation and deintercalation of ions is simply mixed with pitch.

Various types of solutions may be used as the pitch solution. For example, a liquid having low viscosity as well as a solution being in a substantial solid state due to high viscosity may be used. In some cases, a solution partially containing a solid may be also used.

Meanwhile, silicon oxide enabling intercalation and deintercalation of ions which is another component constituting the composite coating layer in the present invention exhibits relatively high hydrophilicity and polarity to one or more materials selected from the group consisting of low crystalline carbon and amorphous carbon and thus provides improved properties in terms of mix preparation or electrolyte impregnation.

A preferred example of the silicon oxide is a substance represented by SiOx. For example, $SiO_2$ hardly intercalates and deintercalates lithium ions used for lithium secondary batteries. Accordingly, in the formula, x satisfies $0.1 < x < 1.5$ and is more preferably $0.5 < x < 1.3$ in order to maintain the structure of silicon oxide and facilitate intercalation and deintercalation of ions.

In the present invention, the structure of the composite coating layer may be determined depending on matrix and filler components.

In a first exemplary structure, a filler comprising silicon oxide enabling intercalation and deintercalation of ions is incorporated in a matrix comprising one or more materials selected from the group consisting of low crystalline carbon and amorphous carbon.

In a second exemplary structure, a filler comprising one or more materials selected from the group consisting of low crystalline carbon and amorphous carbon is incorporated in a matrix comprising silicon oxide enabling intercalation and deintercalation of ions.

In the composite coating layer, since the matrix has a structure, components of which have a continuous phase and the filler has a structure, components of which have independent phases, the content of the matrix component is not necessarily greater than the content of the filler component.

In the composite coating layer, the content of one or more materials selected from the group consisting of low crystalline carbon and amorphous carbon, and the content of the silicon oxide enabling intercalation and deintercalation of ions are not particularly limited so long as the intended effects of the present invention (described above) can be exerted. In a preferred embodiment, in the composite coating layer after the carbonization of step (c), one or more materials selected from the group consisting of low crystalline carbon and amorphous carbon and silicon oxide enabling intercalation and deintercalation of ions may be mixed with each other at a ratio of 1:9 to 9:1, based on weight. Accordingly, when a carbonization yield is 50% in the process of carbonizing the raw material of carbon, i.e., the raw material of one or more materials selected from the group consisting of low crystalline carbon and amorphous carbon may be mixed with silicon oxide enabling intercalation and deintercalation of ions at a ratio of 2:9 to 18:1, based on weight in the mixture for coating of step (b).

The amount (coating amount) of the composite coating layer is preferably 0.5 to 20% by weight, based on the total amount of the anode active material. When the amount of the composite coating layer is excessively low or the thickness thereof is excessively small, effects caused by formation of the composite coating layer may not be obtained and, on the other hand, when the amount of the composite coating layer is excessively high or the thickness thereof is excessively great, disadvantageously, the desired core-composite coating layer structure may not be formed and capacity may be deteriorated.

For formation of the composite coating layer, in step (c), the core-shell precursor is baked. The baking is preferably carried out under an inert atmosphere or an anoxic atmosphere at 600 to 2,000° C. and enables the raw material of amorphous carbon to be carbonized and converted into amorphous carbon, while silicon oxide enabling intercalation and deintercalation of ions is not converted. In a preferred embodiment, the raw material of the amorphous carbon has a carbonization yield of about 20 to 80% and the carbonization yield may have various values depending on the composition of the raw material of amorphous carbon.

The present invention also provides an anode active material prepared by the method.

The anode active material prepared by the method has a structure in which the core comprising a crystalline carbon-based material is coated with a composite coating layer having a matrix/filler structure comprising one or more materials selected from the group consisting of low crystalline carbon and amorphous carbon, and silicon oxide enabling intercalation and deintercalation of ions can solve the problems in the related art, based on specific active material structure and components.

First, silicon oxide enabling intercalation and deintercalation of ions, comprised as the matrix or filler component in the composite coating layer, exhibits high affinity to the hydrophilic solvent in the slurry for producing the anode due to molecular structural properties of oxide, thereby improving dispersability of the solid in the slurry. Accordingly, when the anode is produced by applying the slurry to a current collector, distribution uniformity between components such as a binder and the anode active material is improved and superior electrode properties can thus be obtained.

The improvement in uniformity caused by the hydrophilic material can minimize a partial decrease in bonding strength between the slurry and the current collector which occurs on the non-uniform electrode. The hydrophilic material improves affinity between the active material layer and the surface of the current collector, as well as bonding strength between the active material layer and the current collector and thereby solves a problem of increase in internal resistance caused by separation of the active material layer from the current collector.

Similarly, the silicon oxide enabling intercalation and deintercalation of ions comprised in the composite coating layer imparts relatively high hydrophilicity to at least a part of the anode active material, thereby greatly reducing impregnation time of the highly polar electrolyte in the electrode fabrication process and considerably improving battery productivity.

Second, the silicon oxide enabling intercalation and deintercalation of ions comprised as a matrix or filler in the composite coating layer minimizes a problem of deterioration in electrical conductivity which may be induced by presence of materials enabling intercalation and deintercalation of ions.

Also, in the case of a lithium secondary battery, growth of lithium dendrites may occur, since the crystalline carbon-based material serving as a core has a voltage similar to lithium, but this growth can be inhibited by coating silicon oxide enabling intercalation and deintercalation of ions on the surface of the crystalline carbon-based material at a high oxidation-reduction potential.

The present invention also provides an anode mix comprising the anode active material.

The anode mix according to the present invention comprises 1 to 20% by weight of a binder and optionally 0 to 20% by weight of a conductive material, based on the total weight of the anode mix.

Examples of the binder include polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohol.

Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

If desired, a filler is optionally added to inhibit expansion of the anode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Other components such as viscosity controllers or adhesion promoters may be added alone or in combination.

The viscosity controller is a component to control the viscosity of the electrode mix and thereby facilitate mixing of the electrode mix and application of the same to a current collector and is present in an amount of 30% by weight or less, based on the total weight of the anode mix. Examples of the viscosity controller include, but are not limited to, carboxymethyl cellulose and polyvinylidene fluoride. In some cases, the afore-mentioned solvent may also act as the viscosity controller.

The adhesion promoter is an auxiliary ingredient to improve adhesion of an active material to a current collector and is present in an amount of 10% by weight, based on the binder and examples thereof include oxalic acid, adipic acid, formic acid, acrylic acid derivatives and itaconic acid derivatives.

The present invention also provides an anode for secondary batteries in which the anode mix is applied to a current collector.

For example, the anode is produced by adding an anode material containing an anode active material, a binder or the like to a solvent such as NMP to prepare a slurry, and applying the slurry to an anode current collector, followed by drying and pressing.

The anode current collector is generally fabricated to have a thickness of 3 to 500 μm. Any anode current collector may be used without particular limitation so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. The anode current collector includes fine irregularities on the surface thereof so as to enhance adhesion of anode active materials. In addition, the current collectors may be used in various forms including films, sheets, foils, nets, porous structures, foams and non-woven fabrics.

The present invention also provides a secondary battery comprising the anode and the battery is preferably a lithium secondary battery.

The lithium secondary battery has a structure in which a lithium salt-containing non-aqueous electrolyte is impregnated into an electrode assembly comprising a separator interposed between the cathode and the anode.

For example, the cathode is prepared by applying a cathode active material to a cathode current collector, followed by drying and pressing, and further optionally comprises other components such as binders or conductive materials as described above associated with the configuration of the anode.

The cathode current collector is generally manufactured to have a thickness of 3 to 500 μm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. Similar to the anode current collector, the cathode current collectors include fine irregularities on the surfaces thereof so as to enhance adhesion to the cathode active material. In addition, the cathode current collector may be used in various forms including films, sheets, foils, nets, porous structures, foams and non-woven fabrics.

The cathode active material is a lithium transition metal oxide comprising two or more transition metals as a substance that causes electrochemical reaction, and examples thereof include, but are not limited to, layered compounds such as lithium cobalt oxide ($LiCoO_2$) or lithium nickel oxide ($LiNiO_2$) substituted by one or more transition metals; lithium manganese oxide substituted by one or more transition metals; lithium nickel oxide represented by the formula of $LiNi_{1-y}M_yO_2$ (in which M=Co, Mn, Al, Cu, Fe, Mg, B, Cr, Zn or Ga, the lithium nickel oxide including one or more elements among the elements, $0.01 \leq y \leq 0.7$); lithium nickel cobalt manganese composite oxides represented by $Li_{1+z}Ni_b Mn_c Co_{1-(b+c+d)}M_d O_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphates represented by the formula of $Li_{1+x}M_{1-y}M'_y PO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

The binder, the conductive material and optionally added components are the same as those in association with the anode described above.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics composed of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

Where appropriate, a gel polymer electrolyte may be coated on the separator in order to improve battery stability. Representative examples of the gel polymer may include polyethylene oxide, polyvinylidene fluoride and polyacrylonitrile. When a solid electrolyte such as a polymer is used as the electrolyte, the solid electrolyte may also serve as a separator.

The lithium salt-containing non-aqueous electrolyte is composed of a non-aqueous electrolyte and lithium.

Examples of the non-aqueous electrolyte include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte include nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS) and the like.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of a cyclic carbonate such as EC or PC as a highly dielectric solvent and linear carbonate such as DEC, DMC or EMC as a low-viscosity solvent.

Accordingly, the present invention provides a middle- or large-sized battery pack comprising the secondary battery as a unit battery.

The middle- or large-sized battery pack has a considerably large battery cell (unit cell) size, as compared to a small battery pack in order to obtain high capacity and is thus further consumed in the process of impregnating an electrolyte or the like. Accordingly, according to the present invention, an anode comprising silicon oxide enabling intercalation and deintercalation of ions is preferred in view of substantial reduction in impregnation time.

Preferably, examples of the battery pack include, but are not limited to, lithium ion secondary battery packs for vehicles and power storage.

The structure of middle- or large-sized battery packs using a secondary battery as a unit cell and a fabrication method thereof are well-known in the art and a detailed explanation thereof is thus omitted in this specification.

BEST MODE

Now, the present invention will be described in more detail with reference to the following examples. These examples are provided only to illustrate the present invention and should not be construed as limiting the scope and spirit of the present invention.

Example 1

In the process of preparing pitch having a carbonization yield of 50% as a raw material for low crystalline carbon, silicon oxide (SiO) having relatively high hydrophilicity to a pitch precursor, enabling intercalation and deintercalation of ions and having a mean particle diameter of about 100 nm was added to the pitch precursor, followed by purification, to prepare a pitch/silicon oxide composite. A ratio of pitch to silicon oxide was 8:1, based on weight. The pitch/silicon oxide composite (A) was homogeneously mixed with graphite (B) having a mean particle diameter of 20 μm, as a raw material for the core at a weight ratio of A:B=9:91. This mixture was thermally-treated under a nitrogen atmosphere in an electric furnace at 1,200° C. for 2 hours. During thermal treatment, the pitch was softened and carbonized, and at the same time, was coated on a graphite surface in the form of silicon oxide and a composite, to prepare an anode active material with a core-shell structure, coated with the carbon/silicon oxide composite.

The anode active material, SBR and CMC were mixed in a weight ratio of active material:SBR:CMC=97.0:1.5:1.5 to prepare a slurry and the slurry was applied to a Cu-foil to prepare an electrode. The electrode was roll-pressed to have a porosity of about 23% and punched to fabricate a coin-type half cell. Li-metal was used as a counter electrode of the cell and a coin-shaped battery was obtained using a 1M $LiPF_6$ electrolyte solution in a carbonate solvent.

Example 2

An anode active material was prepared and a coin-type half cell was fabricated in the same manner as in Example 1, except that the weight ratio of pitch to silicon oxide was 8:2 and the weight ratio of the silicon oxide composite to the graphite was 10:90.

Comparative Example 1

Graphite, pitch and silicon oxide were simultaneously mixed at a weight ratio of 91:8:1 without adding silicon oxide in the process of preparing the pitch. This mixture was thermally treated under a nitrogen atmosphere in an electric furnace, an anode active material was prepared and a coin-type half cell was fabricated in the same manner as in Example 1.

Comparative Example 2

An anode active material was prepared and a coin-type half cell was fabricated in the same manner as in Example 1, except that silicon dioxide ($SiO_2$) having a mean particle diameter of about 100 nm was used, instead of silicon oxide (SiO).

Comparative Example 3

An anode active material was prepared and a coin-type half cell was fabricated in the same manner as in Example 1, except that only pitch was used as a coating material without adding silicon oxide (SiO) in the process of preparing the pitch.

Experimental Example 1

Electrolyte impregnation properties of the electrodes fabricated in accordance with Examples 1 and 2, and Comparative Examples 1 to 3 were evaluated. The electrode was roll-pressed to have a porosity of about 23% and a time taken for 1 microliter (μl) of a 1M $LiPF_6$ electrolyte solution in a carbonate solvent dropped on the surface of the electrode to completely permeate to the surface was measured. Results are shown in Table 1 below.

TABLE 1

|  | Ex. 1 | Ex. 2 | Comp. Ex. 1 | Comp. Ex. 2 | Comp. Ex. 3 |
|---|---|---|---|---|---|
| Impregnation time (sec) | 88 | 86 | 91 | 93 | 142 |

As can be seen from Table 1, the electrodes using an anode active material coated with a carbon/hydrophilic material composite according to Examples 1 and 2 of the present invention exhibited considerably short electrolyte impregnation times, as compared to Comparative Example 3 of the electrode using an anode active material surface-coated with carbon alone. The reason for this is that the highly polar electrolyte can be rapidly permeated into particles by coating the surface of the anode active material with a hydrophilic material.

Experimental Example 2

Charge/discharge properties were evaluated using the coin-type half cells fabricated in accordance with Examples 1 and 2 and Comparative Examples 1 to 3. Specifically, during charge, the cells were charged in a CC mode at a current density of 0.1C to 5 mV and then maintained in a CV mode at 5 mV, and charging was completed when current density reached 0.01C. During discharge, the cells were discharged in a CC mode at a current density of 0.1C to 1.5V. As a result, charge/discharge capacity and efficiency of a first cycle were obtained. Then, charge/discharge was repeated 50 times under the same conditions as above, except that the current density was changed to 0.5C. Results are shown in Table 2 below.

TABLE 2

|  | Ex. 1 | Ex. 2 | Comp. Ex. 1 | Comp. Ex. 2 | Comp. Ex. 3 |
|---|---|---|---|---|---|
| Charge capacity (mAh/g) | 398.2 | 405.3 | 398.3 | 387.7 | 385.1 |
| Discharge capacity (mAh/g) | 368.7 | 374.1 | 368.1 | 357.1 | 356.6 |
| Efficiency (%) | 92.4 | 92.3 | 92.4 | 92.1 | 92.6 |
| Capacity maintenance (%) after 50 charge/discharge cycles | 91 | 90 | 85 | 82 | 78 |

As can be seen from Table 2 above, the anode active materials coated with a composite containing silicon oxide (SiO) as a hydrophilic material according to Examples 1 and 2 of the present invention exhibited high capacity maintenance after 50 charge/discharge cycles and high efficiency, as compared to Comparative Example 2 using silicon dioxide ($SiO_2$) as a hydrophilic material. The reason for this is that when silicon dioxide is used, a content of oxygen that irreversibly reacts with lithium is high, efficiency is decreased and lithium oxide prepared during this reaction increases surface resistance of the anode active material.

Also, it could be seen that the anode active materials according to Examples 1 and 2 exhibited considerably high capacity maintenance after 50 charge/discharge cycles, as compared to the anode active material surface-coated with only carbon according to Comparative Example 3. The reason for this is that the hydrophilic material performing the same function as SEI forms a strong bond with a core material via carbon and thereby inhibits removal of the SEI layer in the repeated charge/discharge process. In addition, a material having high charge/discharge voltage is coated, thereby preventing precipitation of lithium and improving ion conductivity.

On the other hand, when, like in Comparative Example 1, graphite and pitch were simply mixed with each other without adding the hydrophilic material in the process of preparing the pitch, the hydrophilic material was not uniformly distributed on the surface of graphite but was instead concentrated thereon, the electrode was entirely non-uniform and had low capacity maintenance after 50-cycle charge/discharge.

INDUSTRIAL APPLICABILITY

As apparent from the fore-going, the anode active material according to the present invention has a specific structure in which a composite coating layer comprising one or more materials selected from the group consisting of low crystalline carbon and amorphous carbon, and silicon oxide enabling intercalation and deintercalation of ions is formed on an outer surface of a core comprising a crystalline carbon-based material, thus being effective in preparation of an anode active material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing an anode active material comprising a core comprising a crystalline carbon-based material, and present on a surface of said core, a composite coating layer comprising one or more materials selected from the group consisting of low crystalline carbon and amorphous carbon, and silicon oxide enabling intercalation and deintercalation of ions, the method comprising:
   (a) mixing a precursor for a raw material of the one or more materials selected from the group consisting of low crystalline carbon and amorphous carbon with silicon oxide enabling intercalation and deintercalation of ions, followed by purification, to prepare a mixture for coating, wherein the precursor for the raw material of the one or more materials selected from the group consisting of low crystalline carbon and amorphous carbon is a pitch solution and the pitch solution is mixed with the silicon oxide enabling intercalation and deintercalation of ions prior to purification of the pitch solution, wherein after mixing of the pitch solution with silicon oxide enabling intercalation and deintercalation of ions, the mixture is subjected to purification, wherein purification comprises removing impurities by thermal treatment, followed by cooling and grinding, wherein the impurities comprise hydrocarbons and sulfur having a relatively low boiling point, wherein said thermal treatment is conducted under an inert atmosphere at a temperature of 350° C. to 700° C.;
   (b) mixing the mixture for coating with a crystalline carbon-based material to prepare a core-shell precursor comprising the raw material mixture for coating applied to the core comprising the crystalline carbon-based material; and (c) baking the core-shell precursor to carbonize the raw material of the one or more materials selected from the group consisting of low crystalline carbon and amorphous carbon into the one or more materials selected from the group consisting of low crystalline carbon and amorphous carbon.

2. The method according to claim 1, wherein the composite coating layer has a structure in which (1) the composite coating layer has a structure in which a filler comprising silicon oxide enabling intercalation and deintercalation of ions is incorporated in a matrix comprising one or more materials selected from the group consisting of low crystalline carbon and amorphous carbon or, (2) the composite coating layer has a structure in which a filler comprising one or more materials selected from the group consisting of low crystalline carbon and amorphous carbon is incorporated in a matrix comprising silicon oxide enabling intercalation and deintercalation of ions.

3. The method according to claim 1, wherein the crystalline carbon-based material comprises one or more of graphite and low crystalline carbon.

4. The method according to claim 1, wherein the precursor is derived from a coal-based material, a petroleum-based material or a petroleum/coal-based mixture.

5. The method according to claim 1, wherein the silicon oxide enabling intercalation and deintercalation of ions is represented by the following formula:

$$SiO_x$$

wherein x satisfies 0.1<x<1.5.

6. The method according to claim 5, wherein x satisfies 0.5<x<1.3.

7. The method according to claim 1, wherein the baking is carried out under an inert atmosphere or an anoxic atmosphere at 600 to 2,000° C.

8. The method according to claim 1, wherein the composite coating layer has a structure in which a filler comprising silicon oxide enabling intercalation and deintercalation of ions is incorporated in a matrix comprising one or more materials selected from the group consisting of low crystalline carbon and amorphous carbon.

9. The method according to claim 1, wherein the composite coating layer has a structure in which a filler comprising one or more materials selected from the group consisting of low crystalline carbon and amorphous carbon is incorporated in a matrix comprising silicon oxide enabling intercalation and deintercalation of ions.

10. The method according to claim 1, wherein, in the composite coating layer after the carbonization of step (c), the one or more materials selected from the group consisting of low crystalline carbon and amorphous carbon and a hydrophilic material comprising the silicon oxide enabling intercalation and deintercalation of ions are mixed with each other in a weight ratio of 1:9 to 9:1.

11. The method according to claim 1, wherein an amount of the composite coating layer is 0.5 to 20% by weight, based on the total amount of the anode active material.

12. The method according to claim 1, wherein the core consists of the crystalline carbon-based material.

* * * * *